(12) United States Patent
Francisco et al.

(10) Patent No.: US 9,819,983 B2
(45) Date of Patent: Nov. 14, 2017

(54) MULTI-DIMENSIONAL DIGITAL CONTENT SELECTION SYSTEM AND METHOD

(71) Applicants: COMCAST CABLE COMMUNICATIONS, LLC, Philadelphia, PA (US); NBCUNIVERSAL MEDIA, LLC, New York, NY (US)

(72) Inventors: Mark David Francisco, Clarksburg, NC (US); Robert Gregory Dandrea, Furlong, PA (US); Sheau Bao Ng, Wayland, MA (US); Myra Einstein, Philadelphia, PA (US)

(73) Assignee: NBCUniversal Media, LLC, Wilmington, DE (US)

( * ) Notice: Subject to any disclaimer, the term of this patent is extended or adjusted under 35 U.S.C. 154(b) by 0 days.

(21) Appl. No.: 14/518,905

(22) Filed: Oct. 20, 2014

(65) Prior Publication Data

US 2016/0112740 A1 Apr. 21, 2016

(51) Int. Cl.
| | |
|---|---|
| *H04N 21/2668* | (2011.01) |
| *H04N 21/442* | (2011.01) |
| *H04N 21/466* | (2011.01) |
| *H04N 21/45* | (2011.01) |
| *H04N 21/25* | (2011.01) |
| *H04N 21/258* | (2011.01) |
| *H04N 21/2343* | (2011.01) |
| *H04N 21/658* | (2011.01) |
| *H04N 21/81* | (2011.01) |

(52) U.S. Cl.
CPC ... *H04N 21/2668* (2013.01); *H04N 21/23439* (2013.01); *H04N 21/251* (2013.01); *H04N 21/25883* (2013.01); *H04N 21/25891* (2013.01); *H04N 21/44218* (2013.01); *H04N 21/44222* (2013.01); *H04N 21/4532* (2013.01); *H04N 21/4667* (2013.01); *H04N 21/6582* (2013.01); *H04N 21/812* (2013.01)

(58) Field of Classification Search
CPC ......... H04N 21/2668; H04N 21/23439; H04N 21/251; H04N 21/25883; H04N 21/25891; H04N 21/44218; H04N 21/44222; H04N 21/4532; H04N 21/4667
See application file for complete search history.

(56) References Cited

U.S. PATENT DOCUMENTS

| | | | |
|---|---|---|---|
| 8,831,902 B2 * | 9/2014 | Wang | H04N 21/25891 725/35 |
| 8,959,540 B1 * | 2/2015 | Gargi | H04N 21/251 725/19 |

(Continued)

*Primary Examiner* — Pankaj Kumar
*Assistant Examiner* — Alexander Boyd
(74) *Attorney, Agent, or Firm* — Fletcher Yoder, P.C.

(57) ABSTRACT

A digital content distribution scheme allows for monitoring of a wide range of data, such as system and behavior events of audiences and playback devices, as well as environmental factors, such as those present at the playback venue. More "static" data may be considered, such as subscriptions, settings, bandwidth, and the like. Based upon the data considered, real or near-real time changes in the content provided to audiences may be made. The changes may be based upon predictions of audience interest made by prediction engine. The techniques may also allow for time-shifting and adaptation of content based upon playback times.

25 Claims, 6 Drawing Sheets

(56) References Cited

U.S. PATENT DOCUMENTS

| | | | |
|---|---|---|---|
| 9,215,423 B2* | 12/2015 | Kimble | H04N 21/25891 |
| 2011/0142413 A1* | 6/2011 | Kang | H04N 21/44213 |
| | | | 386/234 |
| 2013/0145385 A1* | 6/2013 | Aghajanyan | H04N 21/44218 |
| | | | 725/10 |
| 2013/0283162 A1* | 10/2013 | Aronsson | H04N 21/4532 |
| | | | 715/719 |
| 2013/0347018 A1* | 12/2013 | Limp | H04N 21/4532 |
| | | | 725/19 |
| 2014/0189720 A1* | 7/2014 | Terrazas | H04N 21/44218 |
| | | | 725/12 |
| 2014/0337868 A1* | 11/2014 | Garza | H04N 21/44218 |
| | | | 725/12 |
| 2015/0150031 A1* | 5/2015 | Gibbon | H04N 21/44218 |
| | | | 725/12 |

* cited by examiner

MULTI-DIMENSIONAL DIGITAL CONTENT SELECTION SYSTEM AND METHOD

BACKGROUND

The present invention relates generally to the field of digital content creation, preparation and delivery, and particularly to the adaptation of content based upon audience behavior and preferences.

Over the past decades, delivery of content to audiences (e.g., for entertainment, educational, and similar purposes) has evolved very significantly. Historically, films, books, and print matter were delivered by conventional cinemas, through the mail, and through retail establishments. Conventional television transmissions evolved from broadcast technologies to cable, satellite and digital delivery, such as via the Internet. Moreover, distribution of content in various channels may involve broadcast, download, streaming, unicast, and so forth. While all of these technologies still exist in parallel, of increasing importance has been the delivery of content via digital means that can be manipulated when desired, and the adaptation of content to specific audiences, typically upon request. In many situations, audiences may still experience content on regular schedules, such as through linear broadcast, satellite and cable programming. However, increasingly audiences select times and places for reception and playback, using time shifting techniques, storage techniques, on-demand techniques, non-linear Internet-based content retrieval, and so forth.

While audiences may increasingly select particular content based at least in part on the particular device on which the content is to be experienced (e.g., television, computer, smartphone, etc.), there is increasing interest in adapting content for both large audiences, as well as for individuals with or without active participation of the audience. That is, it is commonplace for advertisements to be adapted for particular demographics, times, audiences, and even individuals. These advertisements may be added to or fed prior to, during or after desired content based upon detectable audience preferences. Enhancements in this area are still needed, however.

For example, apart from ad placement in specifically allocated timeslots, the adaptation of actual content based upon potential audience interest is not commonly performed today. In general, once compiled and prepared for distribution, the content itself is generally not altered, although certain minor supplements may be made to it, such as closed captioning, language options, and the like. Similarly, superimposed advertisements and recommendations are common with various types of content, but these have not been used to alter the content stream itself. Few or no successful attempts have been made at altering content based upon potential audience interest during the content experience.

The present disclosure addresses a number of exciting possibilities for altering and/or supplementing content distributed to audiences based upon a range of factors or "dimensions" that may better accommodate audience interests and preferences.

BRIEF DESCRIPTION

The present disclosure, in accordance with certain aspects, relates to a digital content delivery system that comprises an audience data collection system configured to collect audience activity data indicative of audience activity during playback of digital content. An audience environment collection system is configured to collect audience environment data indicative of an audience environment during playback of the digital content, while a background data storage system is configured to store audience background data indicative of a characteristic of the audience. A processing system is configured to determine a likely audience content interest based upon the audience activity data, the audience environment data, and the audience background data. A content adaptation system is then configured to alter digital content delivered to the audience based upon the determined likely audience content interest.

In accordance with another aspect of the disclosure, a digital content delivery method comprises accessing at least audience background data indicative of a characteristic of the audience, determining an initial prediction of audience content interest based at least upon the background data, and monitoring audience activity data indicative of audience activity during playback of digital content and audience environment data indicative of an audience environment during playback of the digital content. The prediction is adapted based at least upon the audience activity data, the audience environment data, and the audience background data. The digital content is altered and delivered to the audience based upon the determined likely audience content interest.

In accordance with yet another aspect, a digital content delivery method comprises accessing at least audience background data indicative of a characteristic of the audience, audience activity data indicative of audience activity during playback of digital content, and audience environment data indicative of an audience environment during playback of the digital content. Audience content interest is predicted based at least upon the background data, and digital content delivered to the audience is altered based upon the determined likely audience content interest.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
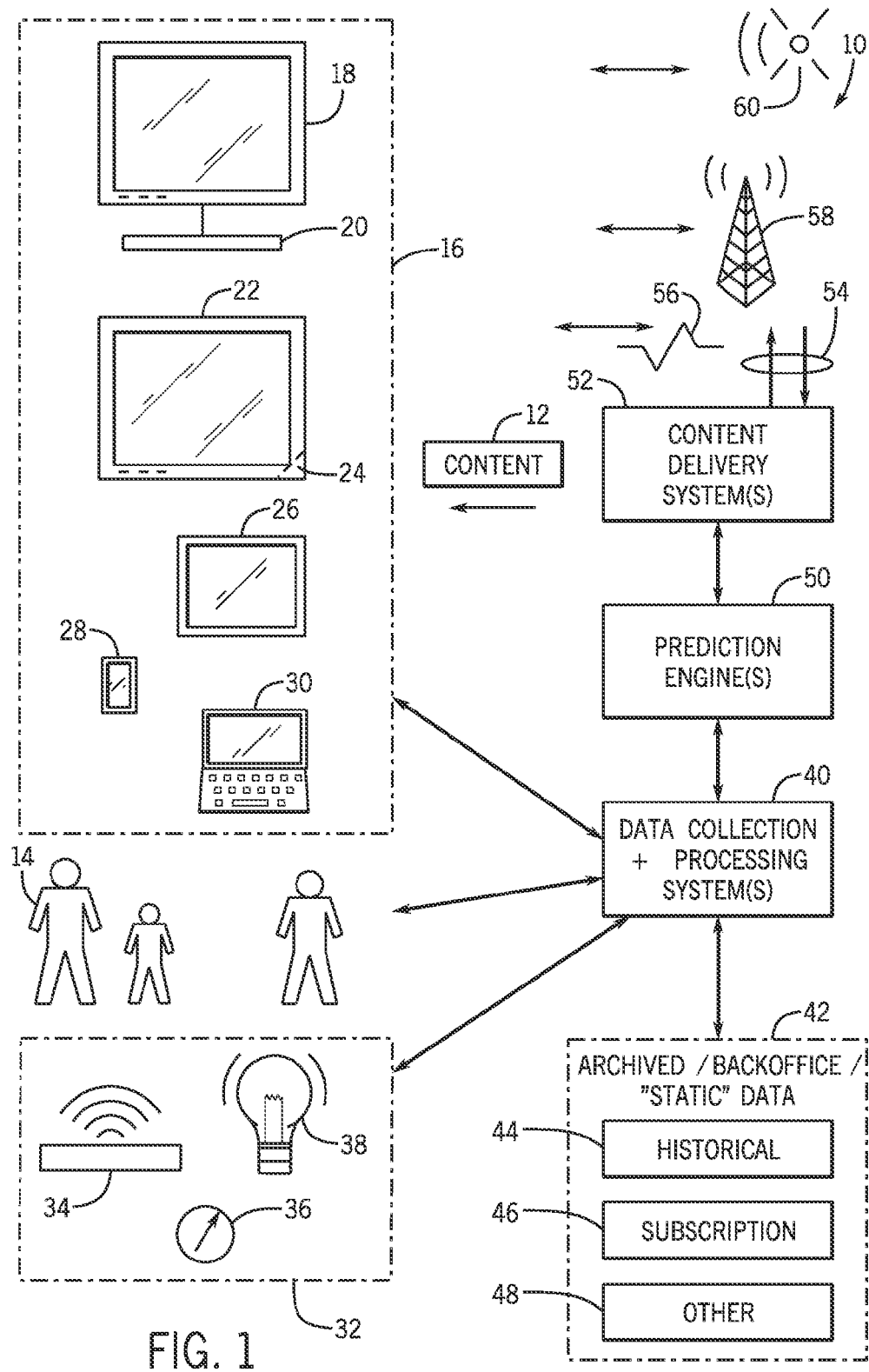
FIG. 1 is a diagrammatical representation of a digital content selection and delivery system adapted to alter delivered content based upon a range of factors in accordance with aspects of the present disclosure.

Turning now to the drawings, FIG. 1 illustrates an exemplary digital content selection and delivery system designated generally by the reference numeral 10. The system is designed to distribute content, indicated generally by reference numeral 12, to audiences 14. It should be noted that the content intended by the present disclosure may include a very wide range of offerings, such as television and film programming, videos, audio content, combined audio and visual content, content intended for both large and specific audiences, and so forth. The content may be altered as described below, and this alteration may both supplement and complement the content so that elements of the content may be stacked or superimposed upon one another and played or experienced together, or alternative content may be provided instead of specific portions of the content. In general, however, the techniques are not simply the replacement of advertisements in specific timeslots as is performed in certain conventional technologies. Rather, the content itself may be altered, and more particularly, it is altered during the audience experience of the content.

Similarly, the audience to which the content is delivered should be understood to be both collective audiences and specific audiences, even to the level of an individual. Such collective audiences may, for example, include many consumers who experience the content at the same time or closely in time, such as through broadcast, satellite, cable and other media that distribute the content for consumption in accordance with regular schedules. However, the audience may also experience the content at different times, places, and manners, such as through time-shifting techniques, storage and recording of the content for later playback, through the use of various support media for the content, including digital media, disks, solid state and dynamic memory, and so forth.

In general, the audience will experience the content on one or more playback devices as indicated generally by reference numeral 16. In certain circumstances, the playback devices may include collective devices, such as cinemas and public displays. In many events, however, the playback devices will be provided in homes, businesses, automobiles, and other more limited venues. In the illustration of FIG. 1, the playback devices include, by way of example, a conventional television set 18 associated with a processing system, typically referred to as a cable, satellite or set-top box 20. As will be appreciated by those skilled in the art, the latter device often serves to receive the content, to decode the content, and to provide audio and visual signals to the television monitor and speakers for playback. Such devices may also exchange information with content providers in a bidirectional manner. Similarly, a playback device 22 in the form of an Internet-ready television will include circuitry, indicated diagrammatically by reference numeral 24, that is adapted to receive and process content, and in certain events to exchange data with the content provider as desired. In both of these scenarios, various supplemental devices, including modems, routers, streaming media devices, computers, and so forth may be associated with the sets to provide enhanced functionality (these devices are not separately illustrated in the figure). Still further, personalized devices such as tablets and hand-held computers, and monitors may be utilized as indicated by reference numeral 26. Other devices may include various types of smartphones and hand-held media players 28. Finally, various computers, laptops, and the like may be utilized as indicated by reference numeral 30. As with conventional and developing devices of this type, content may be received, decoded, and played back, but content may also be stored for later viewing. Some or all of these devices may also be adapted for receipt and playback of content in real time or near-real time as the content is distributed. However, where storage and time-shifting techniques are utilized, timing is much more flexible. Where Internet distribution and other individualized content demand and receipt technologies are utilized, the content may be requested, distributed and played back in a highly individualized manner.

Regardless of the particular device utilized, the particular audience targeted, or the particular content distributed, the present techniques allow for detection and consideration of many different factors, referred to herein sometimes as "dimensions", to determine and predict possible audience interest. Based upon such predictions, the content itself may be adapted to provide an enhanced audience experience. The present techniques allow for detection of certain data and alteration of the content as the content is being experience by the audience. Thus, a tight time loop may be maintained in which audience feedback is obtained and adaptation of the content is made based upon many dimensions that may be indicative of audience appreciation, audience preferences, and a range of considerations (e.g., economic, commercial, cultural, community value, educational, among others).

Among the data that may be considered for the predictions and adaptation of the content are various environmental factors, behavioral factors, and "static" factors. Environmental factors may include, for example, lighting, temperature, location, movement, and a wide and almost unlimited number of different considerations generally representative of the conditions in which content is being experienced by the audience. Events and behavioral factors will typically reflect the behavior of the audience members, including movements, gaze, changes in content selection (e.g., requesting additional different content, changing a channel, increasing or decreasing audio volume, visiting websites or other content during the experience of the primary content, and so forth). "Static" data, which in fact may not be "static" in the sense that it is unchanging, is simply less frequently changing than the other factors, and may include information that is known or knowable by content providers that may be interesting or informative in predicting audience appreciation or interest. Many content providers will or can know such information, and examples are provided below.

In the illustration of FIG. 1, certain environmental devices are illustrated and indicated diagrammatically by reference numeral 32. These may include, for example, motion detection devices 34, including gaming systems, motion detectors, range cameras, and so forth. Temperature sensors and environmental control settings for the environment may be included (e.g., smart thermostats) such as indicated by reference numeral 36. Similarly, lighting and other factors and devices may be considered as indicated by reference numeral 38. Increasingly, these will be networked so that, where permitted by the audience members, settings and states of these devices can be detected, collected, and transmitted for consideration by content providers. The data collected in this manner will typically be of interest insomuch as it may affect the experience of the audience with respect of the content. Thus, alteration of the content may be made to enhance the experience based upon audience behaviors, environmental factors, and so forth.

One or more data collection and processing systems 40 serve to receive and process this data. In addition, a vast array of archived, back office and generally "static" data may be available as indicated by reference numeral 42. By way of example, in the simplified illustration of FIG. 1, this may include certain historical data 44, such as data representative of content that the audience has selected and experienced in the past, behaviors of the audience in the past, environmental conditions under which certain content was experienced in the past, and so forth. Certain subscription information 46 may also be available, and this will typically be more static, although it may change or be changed by the audience from time to time. Subscription information may include, for example, certain channels or content types of providers for which the audience has paid or subscribed, the utilization of such subscription services, and so forth. Other "static" data may also be considered as indicated by reference numeral 48. A wide range of such data may be available, including data related to location of the audience, the type of device utilized by the audience, available bandwidths of the devices and infrastructure, demographics in the local area in which the audience is located, purchases, preferences, and so forth that were made by the audience, and the like.

Based upon some or all of this available information, the data collection and processing systems will implement various algorithms that may be developed and refined over time to make predictions of audience interest in particular content through the use of one or more prediction engines as indicated by reference numeral 50. It should be noted that the data collection and processing systems and the prediction engines will often be implemented in one or more computer systems which will most often be remote from the location in which the content is experienced. These systems may collect the information via Internet connections, data storage and data libraries (particularly for the "static" data) and process the information to determine possible audience interest. The interest will most often be also based upon the particular content being distributed and experienced. The techniques enable a sophisticated approach to the compilation and definition of the content so that various adaptations may be pre-defined and made "on the fly" as the content is experienced based upon the collected and processed data. The content itself is thus alterable in real or near-real time based upon predictions of audience interest. Moreover, a loop is closed as described below so that predictions may be refined and changed if it is determined that alterations and content have not likely enhanced the audience experience.

Ultimately, one or more content delivery systems is called upon to distribute the content to the audience. Such content delivery systems may include or be adapted for two-way communication as indicated generally by reference numeral 54. That is, one or more content streams may be "pushed" to the audience, and this may occur at the same or different times, depending upon the technologies for distribution. Where two-way communications are provided, such as via certain satellite, cable, Internet and similar systems, data may be retrieved from the audience by the same or parallel channels. Illustrated in FIG. 1 are three exemplary distribution technologies, including the Internet 56, broadcast technologies 58, and wired or wireless proprietary networks, such as cable and satellite technologies 60. Any other current or future developed technologies may also be utilized for distribution of the content and for retrieval of certain data useful in making the predictions and adaptation of the content.

Figure 2:
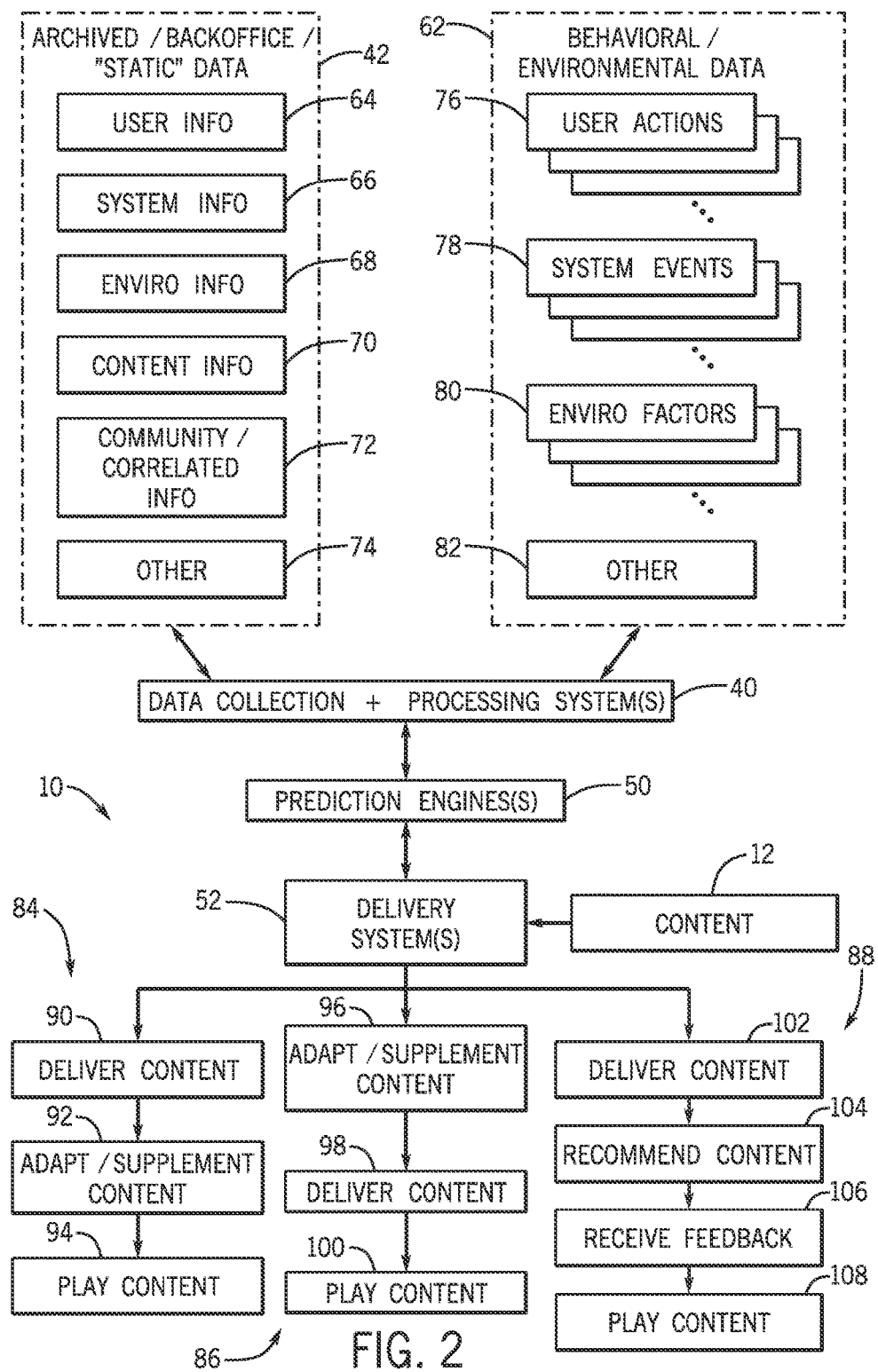
FIG. 2 is a more detailed diagram of certain data and factors utilized in the adaptation and delivery of the content.

FIG. 2 illustrates certain of the considerations and scenarios for data collection, content adaptation, and content delivery in accordance with the presently contemplated embodiments. The system 10 is again adapted to deliver content based upon a range of detectable events and factors. In the illustration of FIG. 2 these are grouped as archived/back office/"static" data 42, and behavioral/environmental data 62. It should be noted, however, that a wide range of content-based data may also be considered, including the nature of the content, classifications of the content, content length, content age, content audience targeting, languages, and so forth.

In the illustration of FIG. 2, the "static" data may include a range of information that is known or knowable by the processing system and prediction engine. These may include, for example, user information 64 that is established by content providers based upon subscriptions, pre-communicated and stored data, and the like. Such user information may also include, however, information collected from other sources, such as user profiles, demographics, income, user tendencies and preferences, and so forth. System information 66 may also be collected and certain of this information may also be known by virtue of subscriptions or paid services of the content providers. However, such system information may also include, for example, data collected from devices themselves, including past connections, content and information stored on the device, "cookies" stored on the device, preferences and settings stored on the device, and so forth. Environmental information 68 may also be accessed. In general, this environmental information is different from the media environment in the venue in which the content is experienced. The environment information 68 may include, for example, times at which the content is experienced, weather conditions, seasons, and so forth. As discussed above, various content information 70 will typically be of interest, and this may be accessed directly from the content or by reference to content libraries, metadata, and so forth. Community and correlated information 72 may be considered as well. This information may include, for example, local demographics of a community, community preferences, neighborhood data, social communities to which the audience or venue belong, and so forth. Various other data may also be considered as well, as indicated generally by reference numeral 74.

The behavior and environmental data 62 will typically be much more specific and faster changing. The ability to detect and make decisions based upon such data enables the techniques to be highly dynamic so that time resolution and reaction speeds are greatly enhanced as compared to heretofore known techniques. Among the behavior and environmental data that may be accessed and considered are user actions, these actions may include, for example, the presence or absence of the audience members, the number of audience members present, movements and activities of audience members, audience member gaze, where this may be determined, verbal activities of audience members (e.g., whether audience members are talking or reacting to the content), audience members moving out of or into a viewing area, and so forth. System events 78 may be detected, typically from devices that are present in the area and that are networked to provide system feedback. In simple situations such events may include whether the audience members have selected different content, changed a channel, requested additional or different content on the same or another device present, and so forth. However, other system events may include, for example, whether audience members have searched for relevant information on smartphones, computers, tablets and other devices present in the region where the content is experienced. Similarly, pausing, backing up, fast forwarding, and similar system events may be detected and considered. Environmental factors at the viewing location 80 will also typically be of interest. These may include, for example, temperatures in the venue, lighting conditions, noise levels, whether audience members are present or potentially experiencing the same or other content in other rooms, and so forth. Many other behavior and environmental data may be considered as well, as indicated by reference numeral 82. Essentially, these are only limited by the ability to detect and convey the data to the processing system for predicting audience interest, monitoring audience interest and correlating these to potential alterations in the content. It may be noted that the "environmental factors" 80 may somewhat overlap with, include, exclude, or be the same as the "environment information" 68 discussed above.

These various types of data are provided to the data collection and processing systems as indicated by reference numeral 40. Based upon the data, then, one or more prediction engines 50 may process the data and determine possible audience interest levels so that content may be altered, additional or different content may be provided, recommendations may be made, and so forth. As will be appreciated by those skilled in the art, the prediction engines will typically be implemented in the form of computer algorithms that correlate the available data with available alterations in the content. The predictions and alterations may be based upon a wide range of factors, first and foremost the enhancement of the audience experience. Other factors may be considered as well, however, such as advertising budgets and advertising goals, commercial considerations, sales considerations, audience values and possible future interests, and so forth. Based upon the selection of available content alterations resulting from the evaluation by the prediction engines, the delivery systems 52 access content 12 and deliver the content to the audience.

FIG. 2 illustrates three different scenarios for content alteration and delivery, although a wide range of different scenarios may also be envisaged and implemented. Those shown in the figures are intended as exemplary only. In the illustration of FIG. 2, for example, in a first scenario 84 content is delivered to the audience as indicated by reference numeral 90, and the content is either adapted or supplemented following delivery as indicated by reference numeral 92. The content is then played to the audience as indicated by reference numeral 94. It should be noted that there are yet other scenarios detailed below for how and where the content is altered for playback. It should also be noted that these scenarios may be implemented where the content is played back as it is delivered (real or near-real time) as well as for time-shifted playback based upon content storage, delays and pauses made in the playback, and so forth.

In a second exemplary scenario indicated generally by reference numeral 96, the desired content is adapted and/or supplemented prior to delivery. In this type of scenario, the distributor of the content may perform the adaptation based upon predicted audience interest and only the adapted content is conveyed to the audience for playback. Thus, following collection of data, prediction of audience interest, selection of the particular adaptation desired, and completion of the adaptation, as indicated at reference numeral 96, content is delivered as indicated at reference numeral 98, for playback by the audience as indicated at reference numeral 100.

The present techniques also allow for at least some degree of audience participation in the adaptation process. In the scenario indicated by reference numeral 88 in FIG. 2, for example, rather than perform the adaptation either on the audience side or the distribution side, a recommendation or suggestion is made to the audience. In the exemplary logic illustrated, this scenario begins with delivery of content as indicated at step 102. Based upon analysis of collected data and prediction of audience interest in various options, one or more recommendations may be made at step 104. Such recommendations may be made in any desired manner, such as by superposition of text or graphics on a playback device, messages, text, graphics or other indicia on other devices that the audience member may have available, audible indicators, and so forth. The audience may accept or not accept such recommendations, and may provide feedback to the content provider. The feedback may, for example, be in the form of a signal or data generated by selection of a button, a region or display, a selection on a remote control or hand-held device, and so forth. At step 106, this feedback is received by the content provider, and the adaptation may be made and the content played as indicated at step 108. As noted above, in certain scenarios the present techniques rely upon collection of data, analysis of data, and a prediction made of possible audience interest in content, adapted content, supplemental content, and so forth.

Figure 3:
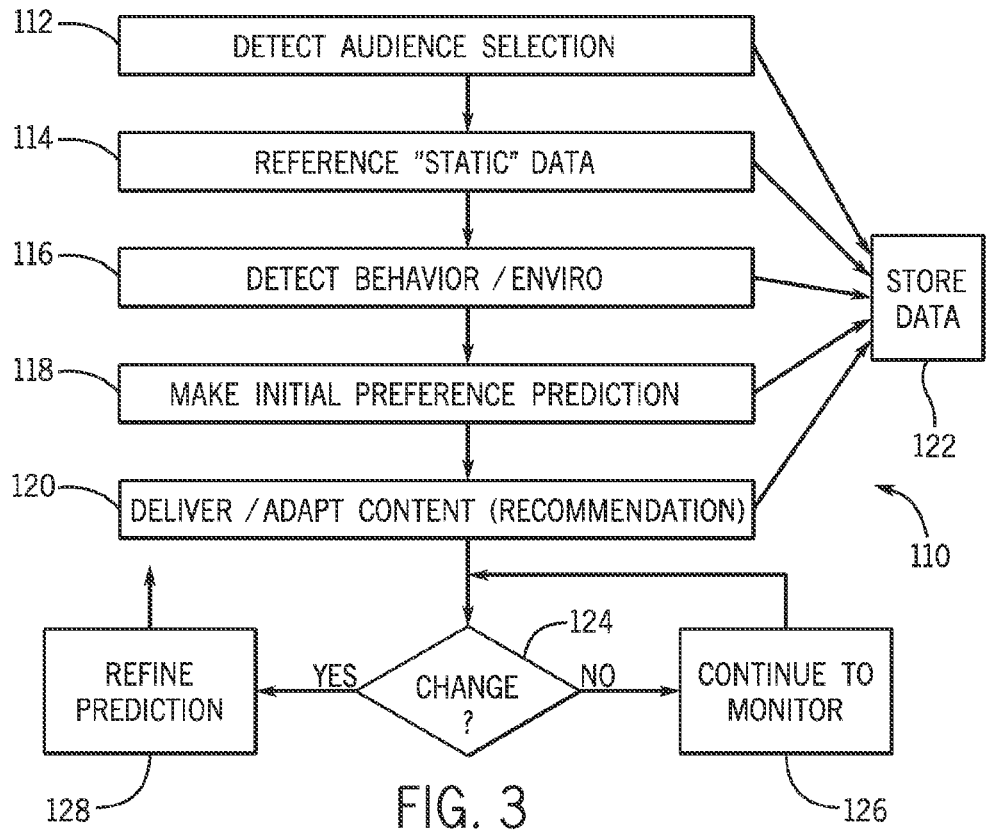
FIG. 3 is a flow chart illustrating exemplary steps in a process for making predictions of audience interests in content, so that the content can be adapted in accordance with the predictions.

In a presently contemplated embodiment, the prediction process and algorithms may be refined based upon continued monitoring of audience behavior, environmental factors, and so forth. FIG. 3 illustrates exemplary logic for initial and refined predictions of this type. In general, the predictions may be made in relation to specific audiences, audience members, and even individuals. However, it should be noted that predictions may be made on a more global scale, such as for groups in which audience members have certain commonalities or similarities, geographic regions, language groups, cultural groups, locations and communities, and so forth. In the logic of FIG. 3, designated generally by reference numeral 110, various audience selections are detected as indicated at step 112. This detection will typically occur when the audience "dials in" or selects certain content or programming. The detection may be made by content providers or distributors connected to the audience devices via networks, typically including the Internet. Based upon the audience selection, then, certain "static" data may be referenced as indicated at step 114. Here again, the static information will often be kept in records such as subscription, audience self-descriptions, detectable and stored data reflective of audience members and groups, and their preferences, and so forth. At step 116, then, behavior and environmental data may be detected. As discussed above, such data will preferably be gathered during the playback experience so that a tight feedback loop may be maintained that allows for close monitoring of audience interest and adaptation of the content based upon detected and predicted interest. At step 118, an initial preference prediction may be made based upon this information. In many cases, the prediction may be fundamentally based upon the particular content, and known background information on the audience. Initial predictions may be less than optimal insomuch as improved predictions will be facilitated by greater amounts of detailed information. However, initial prediction allows for a starting point in refining the prediction process for a particular audience. Initially, no change may be made in the content delivered or perceived by the audience, but the prediction process may continue following monitoring of audience behavior, environmental factors, and so forth. Ultimately, however, content is delivered and may be adapted as indicated at step 120. As noted above, the adaptation may be made automatically without audience participation, or may comprise one or more recommendations that are available for audience selection. In all of these steps, information is stored as indicated at block 122. The storing of the information greatly facilitates further analysis and refinement of the prediction process.

The initial and follow-up predictions may be accurate or sufficiently accurate to predict audience interest, and in many cases may simply indicate that the main content may be fine to maintain audience interest. In other cases, the predications may indicate that altered content may better enhance the audience experience, and accomplish any other goals of the content providers. In either event, it may be determined that the predicted audience interest does not correspond to apparent interest as evidenced by the collected data, and therefore, that the predictions are not accurate and may need improving. As indicated at block 124, then, the algorithm questions whether changes to the prediction or the prediction process should be made. As noted, if it is found that the predicted behavior or interest is accurately reflected by detected behavioral data, the system may continue to monitor the data as indicated at step 126 with no change in the prediction. If, on the other hand, audience behavior or any other factors tend to indicate that the prediction was inaccurate or could be improved, the algorithm may be adapted to refine the prediction as indicated at step 128. By way of example, inaccuracy of predictions may be reflected in audience members moving, leading, altering their gaze, engaging in verbal activities with other audience members, or even changing a channel or content stream.

A wide range of potential scenarios are presently contemplated for carrying out the predictions and content alterations discussed in the present disclosure. The following paragraphs summarize several possible embodiments of the system:

For example, in some embodiments, the technology allows for historically correlating viewing environments with viewed content, and from that correlation enabling an optimal method for delivering real time and targeted updates to actual programming (including advertisement) delivery or recommendations to programming based upon the current viewing environment. The method may be based upon several designs that are inter-related, such as:

Greater granularity in time—the programming/advertisement being viewed are tracked not at the program or ad level, but at much shorter time intervals (e.g., seconds or minutes, such as at the scene level). And the local viewing environment is also monitored at that same smaller time interval;

Multidimensional aspects of viewing environment—not just looking at identity of people present but other broader aspects like room loudness, mood of identified people and of the group, amount of motion, other specific activities ongoing nearby (e.g., cooking, gaming, etc.), time of year, time of day, day of week. This is held in a vector called E(t) below;

Multidimensional aspects of content description—including, but not limited to, age appropriateness, humor level, sports level, action level, drama level, loudness level, anxiety-generation level, fear-generation level, sexual content level and violence level on a scene-by-scene basis. In the description below, this data is held in a vector P(x), where x is the timestamp (offset) of the video in the video asset (program or ad);

Continuous real time and targeted content updates based upon the environment feedback—the small granularity for content and environment sensing allows a continuous real time and targeted "steering" of the delivered content (or of recommendations to it). Significantly, the viewer feedback is passive—the viewers do not need to actively and purposefully interact with the programming. The improved viewing experience can be exposed in several different manners, including:

A. The system allows a user to request recommended content at any time. Upon request the system creates a recommendation list based upon the home environment at that instant in time.

B. The system allows targeted advertising to be inserted into the programming based upon the instantaneous measure of the viewing environment at that time. Normally targeted ads are determined by static factors, so this system allows for a much more adaptive and responsive ad selection.

C. If the programmer has the ability to update the broadcast based upon the collective feedback of audience subscribers, it can do so in a manner identical to a provider-internal flow. If the programming is "live" the continuous automated real time feedback from subscriber homes could be integrated over all homes and fed into the "live" production director for reactively steering the actual content aired based upon collective real time passive viewer feedback.

D. If either the long form programming or short advertisement had multiple instantiations recorded in its creation, the continuous automated real time feedback could steer the content delivery to an individual stationary or mobile viewing device. By way of example, if the room environment is reflective of children present, adult scenes could be replaced with pre-recorded younger audience-appropriate versions. If a movie reflected a battle between two groups or people, and the viewers were responding positively to one entity in the movie, content favoring that entity could be delivered that fed upon the viewer feedback.

E. Continuous automated real time feedback at small time granularity of programming or advertisements could be used not to alter the actual content delivered at that time, but to provide feedback into content creation for future use.

Adaptive learning of the predictive algorithm—as new data is ingested, such as into a provider cloud platform from the home viewing environments, the algorithm is continually updated to improve its accuracy, by testing its current predictions against what the viewing environment is experiencing at that instant. Exemplary embodiments for implementing the system, method and algorithms are illustrated in the figures. One instantiation of a system to support the above new capabilities is displayed below. By way of summary, the data flow, following the data paths notated in the figures may proceed as follows:

1. Content is delivered from a programmer to a provider for delivery to subscribers;
2. The programmer content is processed and groomed within the provider environment and then delivered to subscribers;
3. The provider audience environment monitoring system continually reports real time updates of multidimensional characteristics of local viewing environment to the adaptive learning "content predictor" system;
4. The provider video delivery system exercises use cases (e.g., A, B, and D above) by providing the targeted content delivery system with real time predictions of what type of content (described by a multidimensional content descriptor vector) that would optimize a particular customer's current viewing experience. The targeted video delivery system maps the suggested content type vector to some particular available programming (ads or long-form) using an optimization algorithm;
5. New content or suggestions of new content is provided to the customer for some use cases (e.g., A, B, or D above);
6. Some use cases (e.g., C or E above) may require feedback of the real time home environment update vector, or of the resulting content type prediction vector, to the programmer or content creator;
7. Some use cases (e.g., C above) lead to new real time updates of content from the programmer to the provider; and
8. Some use cases (e.g., C above) lead to real time updates of the programmer's new content to the subscriber.

Data collection from audience environment sensors may proceed as follows, for example. Periodically, the sensors report back a vector H(t) of attributes describing the "whole home" environment at that instant "t" (note that "whole home" is used here to indicate that the vector E(t) may be for a single viewing area or personal viewing device, while vector H(t) is for the whole home (or location)). To support the real time use cases summarized above (e.g., reacting at the scene and ad level), updates may need to be sent roughly every several seconds. The sensors may be able to segregate the home into viewing areas. That is, by having sensors attached to set-top boxes (or otherwise localized devices) or correlated to set-top boxes (or to localized devices) to localize around viewing area, or by having the ability for some audience members (e.g., using hand-held devices) to also be correlated with a viewing area in a location (e.g., a home), such as by enabling location services or microphone services within a device application. Therefore, it may be assumed in some contexts and applications that the full audience environment vector H(t) at time "t" can be segregated into viewing areas (e.g., rooms with playback devices) and it may be assumed that vector E(t) is the home environment vector in one viewing area at time "t".

The vector E(t) may have values for many viewing area environment attributes at time "t" (that is, vector E(t) may be multi-dimensional and time-dependent), such as:

E(1): identity of people present (e.g., if they registered their voice intentionally with voice recognition for identity tracking, fingerprints on mobile client or low power Bluetooth, etc.);
E(2): number of people present;
E(3): overall loudness level;
E(4): amount of motion ongoing in the area (e.g., as determined by motion or other sensors present in the audience location);
E(5): mood of group or of identified people along some other quantifiable quantity (e.g., happy, quiet/loud, cheering, sad, angry, etc.);
E(6): time of day (segment into day-parts);
E(7): social activity in audience environment (e.g., dinner time, as determined from kitchen sensors);
E(8): temperature, indoors and/or outdoors;
E(9): $CO_2$ level;
E(10): identity of the exact scene and ad specific programming being displayed by the client device at that time (this can be conveyed by providing several data items, such as:
  a standard identifier of the currently played content (e.g., the Program identifier for linear programming or Provider identifier and/or Asset identifier for on-demand/non-linear content);
  an Advertisement identifier that is customarily used to track ads and verify that the ad is in displayed at a desired time;
  a timestamp specifying the offset of the current video within the program or the ad (e.g., a number 0-30 secs for a 30 second ad, or a number 0-1800 secs for a 30 minute program).

Note that the attributes in the E(t) vector describe environment-specific data, and content-specific data, such as one or more identifiers of the current programming in the example above). It should also be noted that, as discussed elsewhere in the present discussion, the environmental data may be collected from any available system components and/or sensors present in the audience environment, and in some embodiments and implementations the data may be at least partially compiled or grouped (and at least partially processed) at the audience location before transmission for analysis.

An interesting feature of the technology involves the adaptive learning "content predictor" component or components. Such predictors may proceed as follows. If the new adaptive learning "content predictor" system is denoted "CPS". This system may be the same as or included or cooperative with the prediction engine 50 discussed above. As stated above, each subscriber viewing area reports an E(t) vector back to the CPS periodically. At a high level, the CPS may operate as follows:

First exemplary use case:
  If the audience requests a fresh recommendation to content delivery system, the system reaches out to the CPS to obtain a "suggested" programming vector "P_sug" that will optimize the viewer's experience at that instant. The system compares that P_sug vector to all programming (live, on demand, or recorded) available, and generates a suggested list of actual content to be viewed (that is, conveyed and played) by the audience.

Other exemplary use cases may be as follows:
  A. If the system is to perform a real time update of the programming or advertisement displayed to the audience (without the audience's active request), it requests a "suggested" programming vector "P_sug" that will optimize the audience experience at that instant. The system compares that P_sug vector to all programming available to be inserted into the current stream (either advertising or program content), finds the optimal match, and does the realtime insertion.
  B. If the delivery system is to perform a real time update of the programming or advertisement displayed to the audience (without any or all of the viewers' (potentially millions) active request), it requests a "suggested" programming vector "P_sug" that will optimize the collective audience experience at that instant. The delivery system compares that P_sug vector to all programming available to be inserted into the current broadcast (either advertising or program content), finds the optimal match, and does the real time insertion. If the programming is live, the director of the live broadcast receives the collective feedback from the audience and steers the live event broadcast accordingly.

C. Detailed statistics on the set of E(t) vectors (e.g., for a multitude of audience members, homes, subscribers, etc.) that share a given program identifier at time "t" could be provided from the CPS to programmers or content creators, to give detailed psychographic information about the state of the audience or audience members before, during and after their content was consumed. That could be valuable feedback for future content production.

In some embodiments, the CPS may algorithmically produce a "suggested" programming vector "P_sug" given, as input, an E(t) vector describing the viewing environment at time "t". From the above program description vector P is a multidimensional collection of content attributes that have been found to be relevant for predicting content that optimizes a viewer's experience. They might include, but are not limited to, the following attributes:

P1: appropriateness for age 0-2;
P2: appropriateness for age 3-5;
P3: appropriateness for age 6-8;
P4: appropriateness for age 9-12;
P5: appropriateness for age 13-16;
P6: appropriateness for age 17+;
P7: humor level;
P8: sports level;
P9: action level;
P10: drama level;
P11: loudness level;
P12: anxiety-generation level;
P13: fear-generation level;
P14: sexual content level;
P15: violence level;
P16: season of the year;
P17: outdoor temperature.

P_sug is a special "suggested" program description vector that is used to generate predictions of programming would optimize the experience of some current viewing environment.

One instantiation of an algorithm that could accomplish the functionality of the CPS is as follows:

For a given viewing area in a given home each time the CPS receives an E(t) data item it checks whether there is any program information attached. The program information in the E(t) vector is the program or ad identifier plus a time offset in that identified content. If an element of the program exists in an E(t) update, the CPS converts the information value into a program attribute vector P(t), using a mapping from program information to programming attributes using metadata that the provider obtains from the programmer. That mapping is done when the provider ingests the content from the programmer, and is a static attribute of the content used without alteration throughout the following months during which the content might be delivered to customers. It should be noted, however, that the word "static" here should be understood as not requiring the program attribute vector to be fully static over time, that is, the vector P(t) may be different at times t1 and t2 (which may be just seconds after t1). If the content is new content in the provider's environment as when delivered only at the time of programmer's broadcast, then the provider may need to reach out to the programmer to obtain that metadata in real time, or else such metadata would need to be delivered along with the programming (e.g., out of band).

Once the CPS has collected a sufficient number of [E(t), P(t)] data points for a particular viewing environment in a particular audience environment, it initiates its correlation analysis, that allows it to correlate past behavior in that environment to generate future predictions. The CPS calculates correlation coefficients between environment attributes (E1, E2, E3 . . . ) and programming attributes (P1, P2, P3 . . . ) using that historical data, and constantly updates those coefficients as new data is ingested in order to hone its predictability in an adaptive learning manner.

The following summarizes specific steps the algorithm may walk through to create a P_sug programming vector when polled to do so:

As stated above, once there are sufficient environment/programming data pairs [E(t), P(t)] accumulated, the CPS calculates it first set of correlation coefficients that allows it to subsequently provide a P_sug programming vector if polled. For example, there may be N timestamps "t_i" (for i=1, N) in this historical data set [E(t_i), P(t_i)]. Typical values of N may be large, such as between 100,000 and 1,000,000. Alternatively, a minimum threshold of time, such as 24 hours, may be used to trigger the system calculation. This may be useful to ensure that the output P_sug vector is computed based on a sufficiently large historical data set.

For each of those N timestamps, the CPS has an environment vector with attributes E1, E2, E3, . . . , E9 and a programming vector with attributes P1, P2, P3, . . . , P17. (We use the above examples of non-programming attributes of the vector E and attributes or vector P, but that is just exemplary.)

Each programming vector will generally be normalized to 1, so that the algorithm below makes sense. Mathematically, that means that for each timestamp t, the numbers P1, P2, . . . , P17 satisfy are between 0 and 1, and must satisfy:
1=P1*P1+P2*P2+P3*P3+ . . . +P17*P17.

Qualitatively, that means if a vector value P(t) is assigned to an instant in time of a comedy-sports movie, one cannot assign both the humor attribute P7 and the sports attribute P8 the maximum value 1. Each could be assigned the value 0.707, with no other attributes given any weight, so that the norm of the vector P*P would equal 1.

The following equations may be utilized by the system:

$$C(E_i; P_j) = \frac{\frac{1}{N}\sum_{k=1}^{N} E_i(t_k)P_j(t_k)}{\frac{1}{N}\sum_{k=1}^{N} |E_i(t_k)|^2};$$ [Equation 1]

$$C(E_1; P_3) = \frac{\frac{1}{N}\sum_{k=1}^{N} E_1(t_k)P_3(t_k)}{\frac{1}{N}\sum_{k=1}^{N} |E_1(t_k)|^2};$$ [Equation 2]

$$C(E_a, E_b; P_j) = \frac{\frac{1}{N}\sum_{k=1}^{N} \sqrt{E_a(t_k)E_b(t_k)} \cdot P_j(t_k)}{\frac{1}{N}\sum_{k=1}^{N} E_a(t_k) \cdot E_b(t_k)};$$ [Equation 3]

$$C(E_1, E_2; P_3) = \frac{\frac{1}{N}\sum_{k=1}^{N} \sqrt{E_1(t_k)E_2(t_k)} \cdot P_3(t_k)}{\frac{1}{N}\sum_{k=1}^{N} E_1(t_k) \cdot E_2(t_k)};$$ [Equation 4]

-continued $$C(E_a, E_b, E_c; P_j) = \frac{\frac{1}{N}\sum_{k=1}^{N}|E_a(t_k)E_b(t_k)E_c(t_k)|^{\frac{1}{3}} P_j(t_k)}{\frac{1}{N}\sum_{k=1}^{N}|E_a(t_k)E_b(t_k)E_c(t_k)|^{\frac{2}{3}}};$$ [Equation 5]

$$C(E_1, E_2, E_3; P_3) = \frac{\frac{1}{N}\sum_{k=1}^{N}[E_1(t_k)E_2(t_k)E_3(t_k)]^{\frac{1}{3}} P_3(t_k)}{\frac{1}{N}\sum_{k=1}^{N}[E_1(t_k)E_2(t_k)E_3(t_k)]^{\frac{2}{3}}}.$$ [Equation 6]

The CPS first calculates single-point correlation coefficients for each environment attribute E against each programming attribute P, as follows.

C(Ei; Pj)=0 if Ei(t)=0 for all N times t; else see equation 1

For example, the single correlation for E1 against P3 is C (E1; P3): see equation 2.

It provides the relative frequency at which E1's presence in the local environment lead to programming occurring at that instant with attribute P3 present. Note that a large value of C (E1; P3) does not mean that much P3-type programming occurred with E1 present in the local environment.

It does however mean that if E1 is present in the local environment, much of the programming experienced at that time will have a P3 attribute.

In the example given here, using the N~100,000 sample data points, the CPS would calculate 9*17=153 numbers (single-point correlation coefficients):
C(E1; P1), C(E2; P1), . . . C(E9, P1)
C(E1; P2), C(E2; P2), . . . C(E9, P2)
.....
C(E1; P17), C(E2; P17), . . . C(E9, P17)

The CPS then calculates all 2-point (E attribute) correlation coefficient against each single programming attribute P1-P17.

C(Ea,Eb;Pj)=0 if Ea(t)*Eb(t)=0 for all N times t; else see equation 3

For example, the 2-point correlation for E1 and E2 against P3 is in accordance with equation 4.

It provides the relative frequency at which E1 and E2's dual presence in the local environment lead to programming occurring at that instant with attribute P3 present. Note that a large value of C(E1, E2; P3) does not mean that much P3-type programming occurred with E1 and E2 both present in the local environment. It does however mean that if E1 and E2 are both present in the local environment, much of the programming experienced at that time will have a P3 attribute.

In the example given here, the CPS would calculate (9*8/2)*17=36*17=612 numbers (2-point correlation coefficients):
C(E1,E2; Pj), C(E1,E3; Pj), . . . C(E1,E9, Pj) (for j=1-17)
C(E2,E3; Pj), C(E2,E4; Pj), . . . C(E2,E9, Pj) (for j=1-17) .....
C(E7,E8; Pj), C(E7, E9; Pj) (for j=1-17)
C(E8,E9; Pj) (for j=1-17).

The CPS then calculates all 3-point (E attribute) correlation coefficient against each single programming attribute P1-P17.

C(Ea,Eb, Ec;Pj)=0 if Ea(t)*Eb(t)*Ec(t)=0 for all N times t; else see equation 5.

For example, the 3-point correlation for (E1, E2, E3) against P3 may be in accordance with equation 6.

It provides the relative frequency at which the simultaneous tri-presence of E1, E2 and E3 in the local environment lead to programming occurring at that instant with attribute P3 present. Note that a large value of C(E1, E2,E3;P3) does not mean that much P3-type programming occurred with E1, E2 and E3 all present in the local environment. It does however mean that if E1, E2 and E3 are all both present in the local environment, much of the programming experienced at that time will have a P3 attribute.

In the example given here, the CPS would calculate all 3-point correlation coefficients:
C(Ea,Eb,Ec; Pj) (for a=1-7, b=(a+1)-9, c=(b+1)-9, j=1-17).

For each programming attribute Pj (j=1, 17), the CPS then calculates all higher order (4, 5, 6, etc.) environment attribute correlation coefficients in a similar manner as above.

After calculation of the full set of correlation coefficients, the CPS then goes into a learning mode, looking for either the presence of strong or zero correlations that lead to a particular type of programming. This is best demonstrated with an example. Suppose the single point correlation for E4 yields no specific information about a programming type. That means the set of 17 single point coefficients [C(E4,P1), C(E4,P2), . . . C(E4,P17)] are spread randomly across the 17 programming attributes. For example, there is no particular amount of predictability obtained by simply looking at that one environment attribute E4. On the other hand, suppose that environment attribute E3 produces a set of 17 coefficients [C(E3,P1), C(E3,P2), . . . C(E3,P17)] that has large weight for a few programming attributes (eg, humor and kids-age-appropriateness and content-loudness), and near-zero weight for all others. Then that set of correlation coefficients shows large predictability value—perhaps E3 is the presence of a particular child in the home. Note that a zero correlation between an environment attribute Ea and a programming attribute Pj is significant and predictive: it means that when Ea is present in the environment the programming has a distinctive lack of attribute Pj. Contrast that to the set of 17 numbers for environment attribute E4 [C(E4,P1), C(E4,P2), . . . C(E4,P17)] which is spread evenly with no coefficients near 0 and none large, but rather all middle-sized, then that correlations set shows no predictability value: the presence of environment factor E4 in the viewing area cannot be correlated to any particular programming type.

By way of example, assume that 3 audience members are considered, "mom" (E1), "dad" (E2) and "5 year old daughter" (E3). Suppose the single point correlations for E1, E2 and E3 show no predictability. The environment attribute for time of day is added (call it E4 in this example), and although the group seem to be together 5-8 pm nightly, still no predictabilty is seen in the 17 four-point correlation coefficients C(E1,E2,E3, E4; Pj) for j=1-17. But then when the environment attribute E5 that uses the kitchen sensors to determine dinner-time is added, a strong correlation if found in the 5-point coefficients C(E1,E2,E3,E4,E5;Pj). Apparently the family likes having child programming on before dinner, the news on during dinner and game shows on after dinner. But dinner is always randomly served between 5-7 pm, so no correlation could be found until the kitchen sensor arrays were added to the home environment attribute set.

When the CPS is polled for a suggested programming type P_sug for a particular viewing area in a particular household (as part of use cases "A"-"E" above), it first obtains the most recent environment report E(t) update for that viewing area in that home. As these reports come into the CPS about once per second, it should have a very recent snapshot of the viewing environment for which it is being requested to generate suggested programming.

From that latest E(t) vector, the CPS looks at which environment attributes E1, . . . E9 are present. From that set it searches the correlation coefficients it has generated through steps 1-10 above, looking for correlations that that are predictive along the particular dimensions for which this E(t) vector has attributes present. Suppose, for example that it finds strong positive correlation matches for content with attributes along three attributes (eg, sports/humor/rancorous-volume), and strong negative correlation (ie, zero overlap) along three others (violent/adult/kids-appropriate). The other 17-6=11 programming attributes showed no correlation either way (positive or negative). The CPS then creates a suggested programming vector "P_sug" with maximum values for the 3 positive attributes, zero values for the 3 negative attributes, and "Don't Care" labels for the other 11 programming attributes Pj. The CPS is then done with it's job.

Depending upon the product use case "A"-"E" being exploited, the recipient of the "P_sug" vector may be the provider's data processing system, the provider's delivery system, or the programmer's delivery system. If, for example, the provider's delivery system were to request this in order to do a real time insertion of new programming or advertisement, it might follow the following logic to map the P_sug vector into actual programming:

The insertion system has some universe of insertable content handy. It polled the CPS to determine what exactly to insert for a particular viewing area in a particular home.

The provider has assigned to each of those insertable pieces of content a programming description vector P. If the insertion is occurring for only a small time slice of programming content, then those P vectors only describe the insertable content for that small time slice.

For each piece of insertable content the provider internal targeted video delivery system does a dot product of the P_sug vector and the content's P vector to determine how well they align. The content with the largest dot product results is most aligned to the suggested programming and is used for the insertion.

If the use case being exercised is case "A" above, where the system is looking to present several options for recommended content, then the system does the steps described above with all the OnDemand, DVR'd and live content it wants to check, and presents the highest dot-product content as its recommendation.

Opt-Outs

Figure 4:
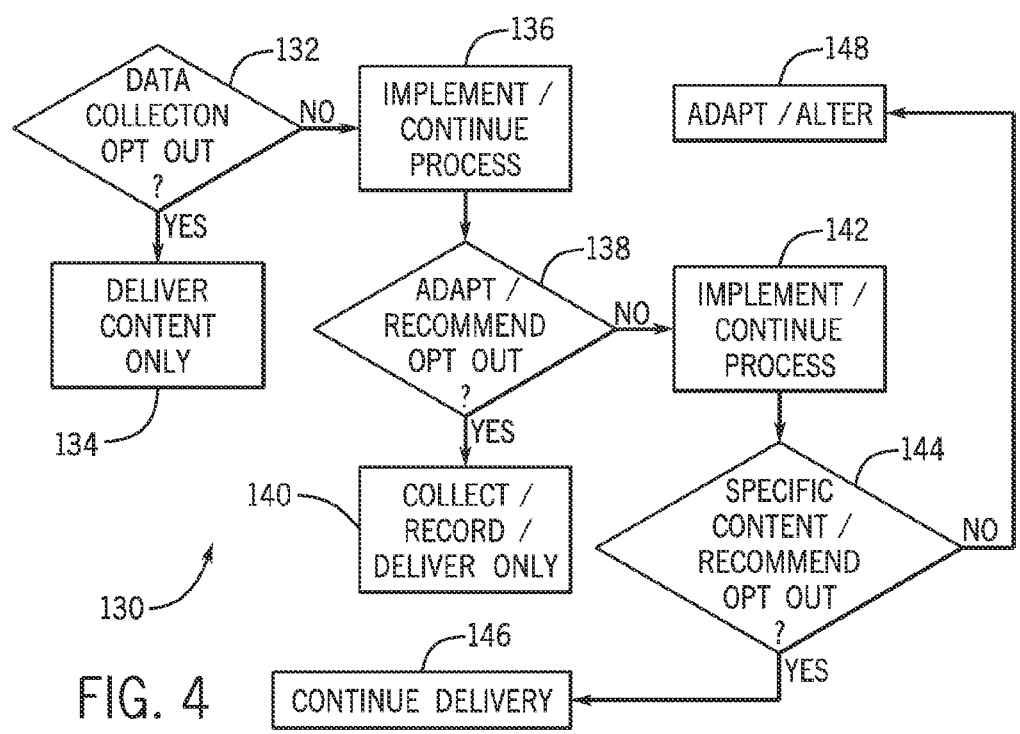
FIG. 4 is a flow chart illustrating exemplary logic that permits audiences to opt out of certain aspects of the technique.

Throughout the process, it is presently contemplated that certain "opt-out" phases or points may be allowed for audience members. A greatly enhanced audience experience will often include audience knowledge that adaptations are available and being made with or without audience participation. However, independence and respect for audience desires may be afforded by various opt-out selections. An exemplary set of opt-out selections and logic are illustrated in FIG. 4 and indicated generally by reference numeral 130. For example, one or more audiences may opt out of data collection altogether as indicated at step 132. Such selections may be made globally and may be relatively "static", and referenced by the system implementing the techniques described. Alternatively, temporary opt-outs of this type may be selected. Opt-outs of this type may also be selected based upon time periods, locations, specific audience members, specific content feeds or channels, and so forth. If this type of opt-out is selected by the audience, content is delivered as indicated at step 134, but the type of data indicated above, or limited data sets based upon opt-out selections are made. If no opt-out occurs, the process may be implemented or continued as indicated at step 136.

As noted above, certain adaptations or recommendations may be made to the audience based upon collected data and predictions of audience interest. An opt-out for such adaptations and recommendations may also be made as indicated at step 138. If such opt-outs are selected, then, data collection and recording may continue along with the delivery of content as indicated at step 140, without adaptation of the content or proposal of recommendations to the audience. Here again, such opt-outs may follow specific audience members, time periods, channels or content streams, locations, and so forth. Moreover, in certain systems a default opt-in may be assumed, with audience members being able easily to opt-out upon selection of this option. Such facilities may of particular interest for specific contents or content streams. If such opt-outs are not made, then the process may be implemented or continued as indicated at step 142.

At step 144 specific opt-outs may be made for specific content or recommendations. In a general sense, these opt-outs may be more punctual, temporary, or specific than opt-outs made at step 138. That is, opt-outs made at 138 may be stored in relatively "static", where specific opt-outs made at step 144 may be made in the temporary and facilitated manner described above. Where such opt-outs are made, data is conveyed to the processor or processors that make changes or recommendations to the audience, and the delivery of content is continued as indicated at step 146 without the alterations or recommendations being made. If such opt-outs are not made, then, the content may be adapted or altered in accordance with the process, as indicated at step 148.

Figure 5:
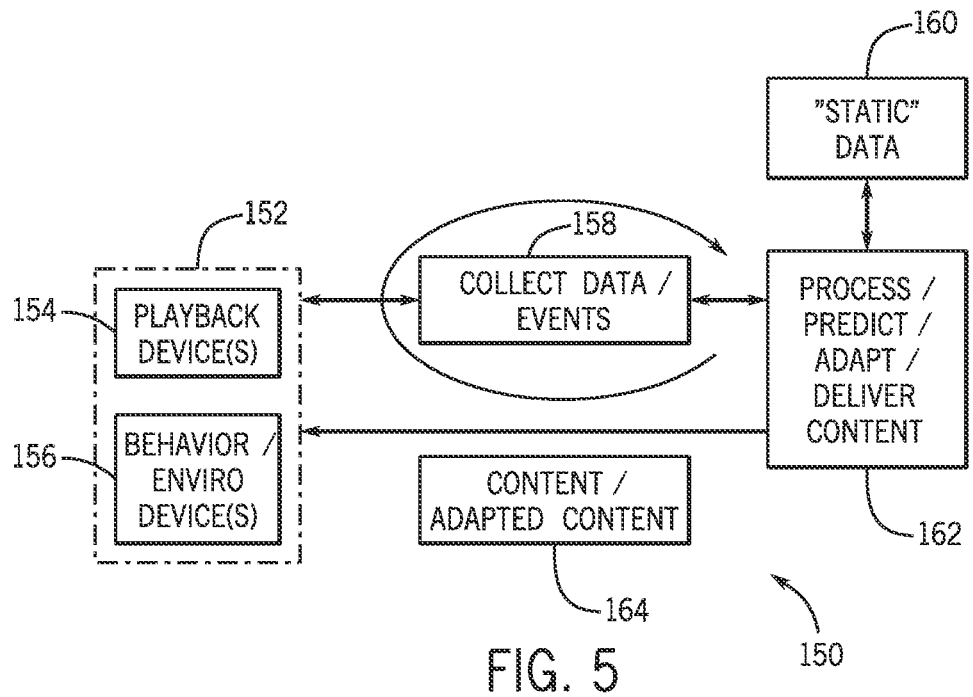
FIG. 5 is a diagram illustrating one exemplary scenario for adapting content and delivering adaptive content to audience devices.
Figure 6:
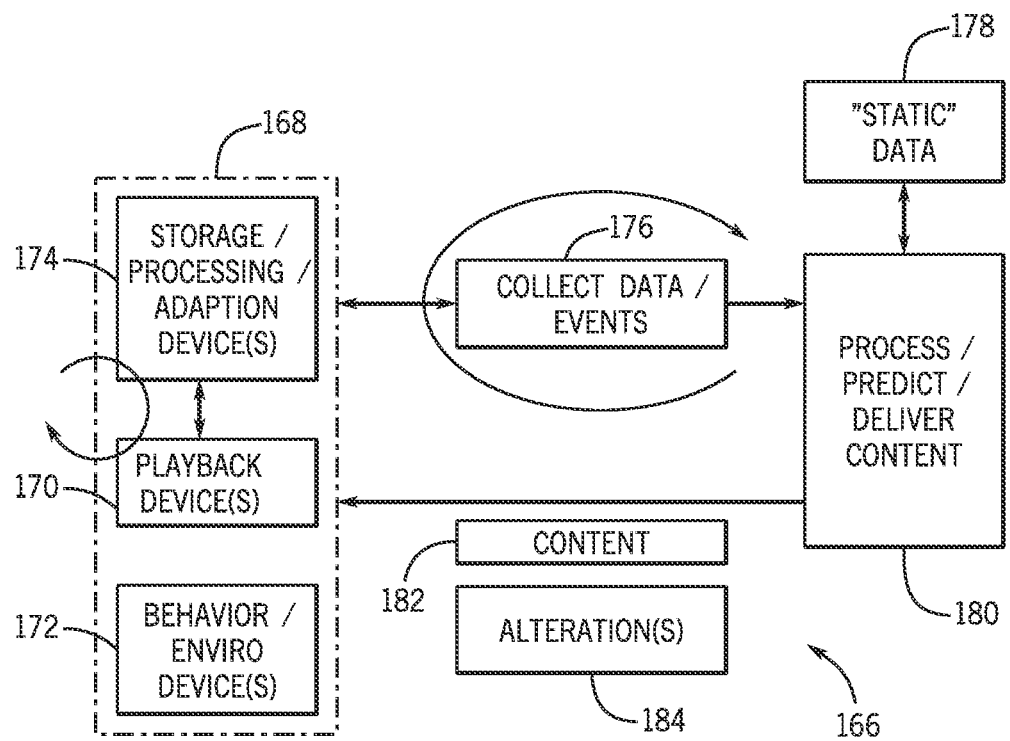
FIG. 6 is a similar diagrammatical representation of an alternative content adaptation and delivery scenario.

As indicated above, several different scenarios may also be envisaged for how and when alterations are made to the particular content. FIGS. 5 and 6 illustrate two such scenarios that are presently contemplated. In the logic of FIG. 5, the content adaptation scenario 150 involves collecting data from one or more audience devices, such as indicated by reference numeral 152. As described above, these may include one or more playback devices 154 that log audience activities and events (e.g., selection of a content stream, changing of content streams, volumes, scenes, and so forth) as well as behavior and environmental detection devices 156. As also noted above, a very wide range of such devices may be referenced, including devices that can detect and register audience movement, audience gaze, conversations and verbal activities, sounds, temperatures, lighting and other such factors within the venue, and so forth. These sets of data may be collected continually or periodically (e.g., upon a change) and conveyed to providers as indicated by block 158. Certain "static" data may also be referenced as indicated by block 160, including the background, subscription, historical information, and so forth discussed above.

In this particular scenario, then, predictions may be made and monitoring performed of audience interest or apparent audience interest as indicated by the collected data. Such analysis may be performed in a "back office" application that continuously or periodically runs at one or more content provider locations. In many events and implementations this will entail a series or multitude of computers that perform analysis as the content is being experienced by the audience. Based upon available alterations that can be made to the content, recommendations that can be made, and the like. The content may be adapted as indicated at step 162 and delivered to the target audience. In this particular scenario, then, the content or the content in its adapted form is delivered directly as indicated by block 164. The cycle illustrated in FIG. 5 indicates that the process is continued so long as the audience is experiencing the content and/or alterations are available to the content based upon the particular content configuration, pre-established content options, and so forth.

FIG. 6 illustrates a somewhat different arrangement and logic indicated by reference numeral 166. Here, multiple audience devices may also be referenced and controlled, these being collectively identified by reference numeral 168. First and foremost, one or more playback devices 170 will be available to the audience for experiencing the content. Here again, behavioral and environmental detection devices may be present and one or more these may be monitored as an indication of audience interest. Here, however, one or more storage, processing or adaptation devices may be present as indicated by reference numeral 174. In some implementations, these devices may take the form of a set-top box, cable modem, circuitry in the receiver or playback device itself, local computers and processors, and so forth. As will be appreciated by those skilled in the art, such processing capabilities are typically associated with their own memory so that some or all of the conveyed content and various options for alteration may be stored locally.

The data is then collected from the playback devices in an environmental and behavioral sources as before, as indicated by reference numeral 176. This is again conveyed to one or more content providers as before, which may also reference "static" data for the audience, audience devices, and so forth. Based upon the available data, then, the process may be implemented and predictions made of possible audience interest. Based upon the selected content and available alternatives or supplemental content, then, these both may be delivered to the audience as indicated by reference numerals 182 and 184. That is, one or more data streams may be conveyed to the audience devices that include the basic content to be experienced along with one or more alterations in the content. These may then be made locally by the storage/processing/adaptation devices 174. Such scenarios may facilitate adaptation, time resolution for feedback and adaptation, and so forth. In certain implementations certain of the predictions may also be made at the audience side. Of course, various hybrid implementations may be envisaged in which more or less of the processing, prediction and adaptation are performed on a provider side and on an audience side. Thus, more major adaptations or adaptations requiring significant bandwidth may be made on a provider side and other adaptations may be made on an audience side. These processes may be altered, of course, to account for delays (e.g., as evidenced by buffering) or utilization of bandwidth, availability of bandwidth and processing capabilities, and so forth. In some scenarios, the location and manner in which the processing is performed may be highly adaptable based upon such factors.

Figure 7:
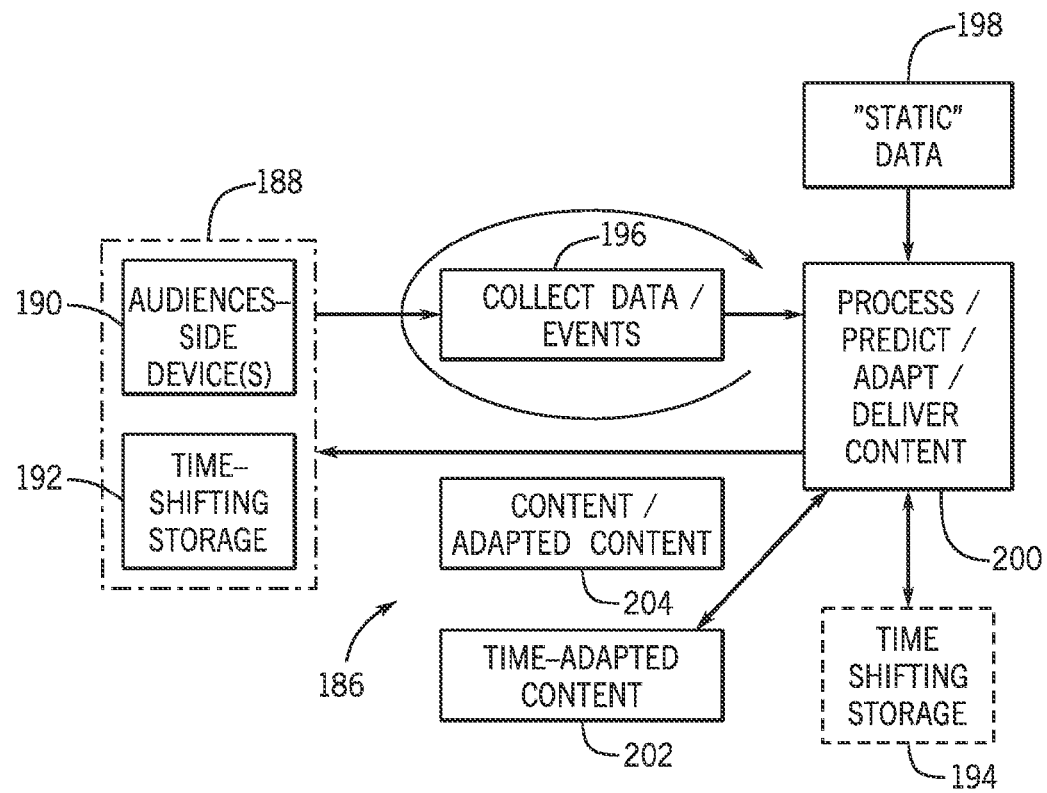
FIG. 7 is a similar diagrammatical representation for a scenario involving time-shifting of content experiences.

As also noted above, in certain scenarios content and the content experience may be delayed or time-shifted. Such time shifting may involve mere moments, seconds or minutes, such as based upon pausing, rewinding or advancing in a content stream or stored content. In other situations the time shifting may involve days, weeks or more, such as where content is stored for later experiencing, or even when content is stored, purchased or rented on alternative supports (e.g., storage disks). Such scenarios may also arise where content is distributed in highly individualized manners, such as via the Internet. In all of these scenarios, the content will likely be experiences by smaller audiences, although some audiences may experience the content at the same or closely in time. Logic for distribution and adaptation of content in these scenarios is summarized in FIG. 7 and indicated generally by reference numeral 186. Here again, various audience-side devices may be present as indicated by reference numeral 188. These may include various playback devices, processing capabilities, computers and so forth as indicated by reference numeral 190. Here again, audience events may be registered and logged by such devices. These devices may also include those that provide indication of the environment and audience behavior as indicated above. One or more time-shifting storage devices may also be present as indicated by reference numeral 192. These will typically involve recording devices of various types, including both mechanical and solid-state recording devices, memories, and so forth. These will be capable of at least temporarily storing content and content alternatives. One or more other times-shifting storage devices may be present on a provider side as indicated by reference numeral 194. In many cases, both locations may enable at least some storage for the shifting of the audience experience of the content.

As in the previous scenarios, data and events are detected, collected and transmitted to content providers as indicated by block 196. Here again, "static" data may be consulted as indicated by reference numeral 198. Based upon all of this data, then, processing, predictions, and adaptation may be performed as well as content delivery as indicated by block 200. A significant difference may occur, however, in the adaptation, as well as in the processing and predictions by virtue of the time-shifted experience. That is, in many cases it may be desirable to reference time-adapted content 202 that was either unavailable or inappropriate at the earlier time period. That is, content may be added or deleted from time to time and updates in the available content may be available that are different from those available when the content was earlier transmitted and experienced by other audience sectors. The time-adapted content, then, may be utilized in the prediction and adaptation process and thereafter content and adapted content conveyed to the audience as indicated by block 204. Here again, it should be noted that the scenarios of FIGS. 5 and 6, and various hybrid scenarios may also be implemented, such as for processing, adaptation (and even prediction) at a client side, as well as some or all of these functions being performed at both a providers side and a client side.

Figure 8:
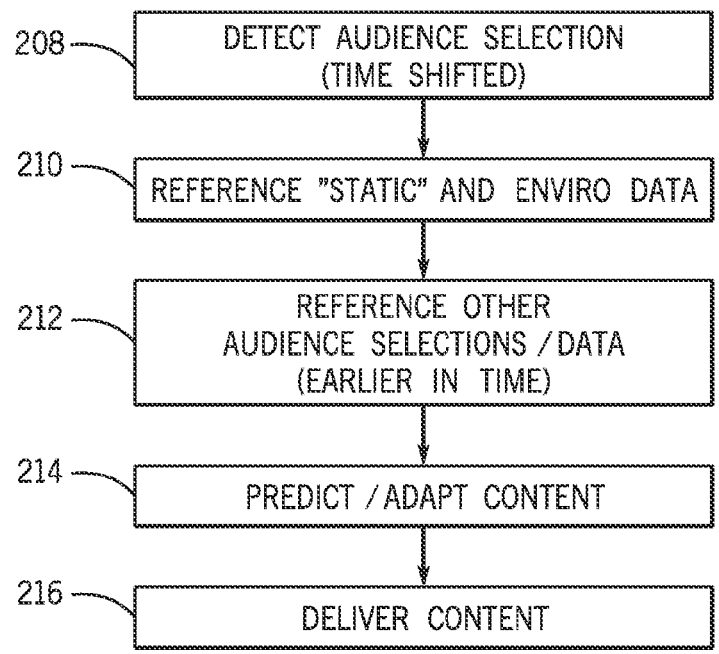
FIG. 8 is a flow chart illustrating the adaptation of the adaptive content in time-shifted audience experience scenarios.

An interesting option is available when content and adaptations are made in a time-shifted manner. For example, as summarized in logic of FIG. 8, and as designated generally by reference numeral 206, reactions and behavior of other audiences that experience the content at earlier times may be referenced to enhance the prediction and adaption process for later-experiencing audiences. As indicated by step 208, for example, a time-shifted audience selection may be detected to begin the process. This selection may involve referencing metadata associated with the time-shifted content. Detection of streaming of the particular content, or requesting the content by the audience, referencing fingerprint or other indicators of the content or the particular portion of the content, and so forth. Here again, then, certain "static" in environmental data may be detected and may be conveyed to the content provider as indicated by step 210. It should be understood that this data may also include behavioral data for the time-shifted audience as before. At step 212, however, reference may be made to other audience selections and data, that is, for audiences that experience the content earlier in time. Such references may include indications of audience interest, audience behavior, changes to the content stream, pauses, advances and replay of content, storage of content, various audience reactions, and so forth. Based upon such known audience interest indicators, then, a much more improved prediction of the interest of the time-shifted audience may be made. At step 214, then, the prediction and adaptation may be made to the content and the content may be delivered at step 216. As in the previous scenarios, of course, this may be performed on the audience side, on the provider side, or both.

Figure 9:
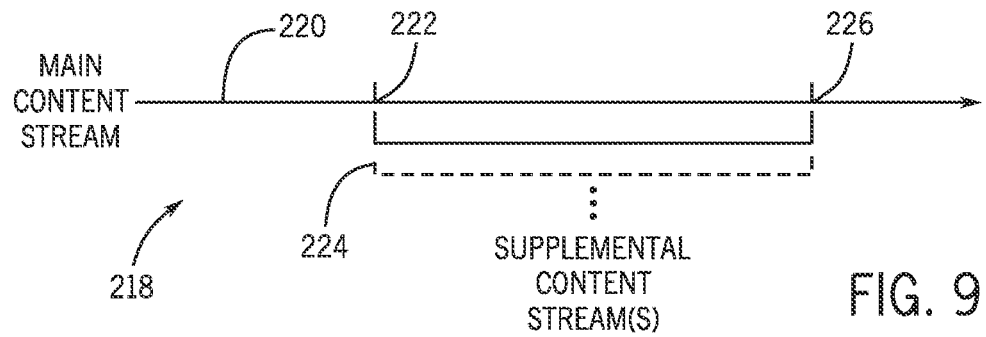
FIG. 9 is a diagrammatical representation of a content stream and illustrating the inclusion of supplemental content in accordance with the present techniques.
Figure 10:
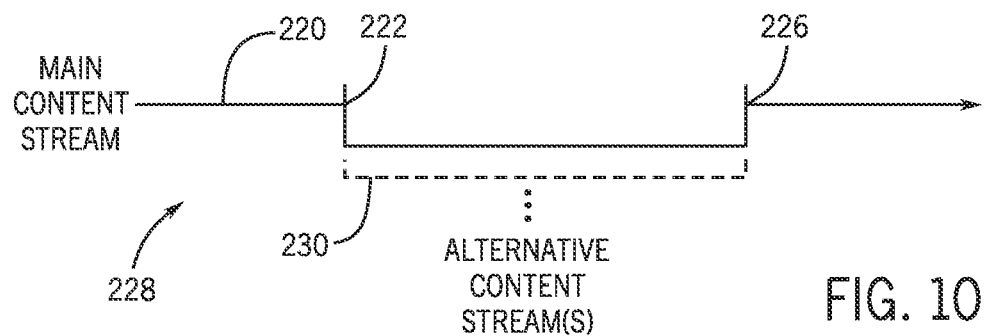
FIG. 10 is a similar diagram illustrating the use of alternative content in the stream.
Figure 11:
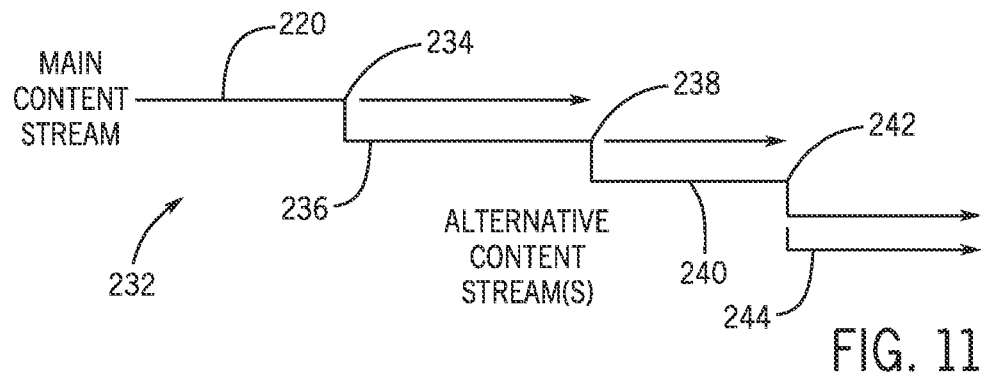
FIG. 11 is a similar diagram illustrating branching of content.

As also noted above, several different scenarios may be envisaged for the alterations, supplements and other changes to the content requested by, selected by or delivered to audiences. FIGS. 9, 10 and 11 illustrate exemplary implementations in this regard. As noted, rather than simple replacement of advertising in pre-selected slots. The present techniques allow for real or near-real time alteration of content streams based upon a range of factors or dimensions monitored and considered by content providers. In general, a content will consist of a main content stream, such as television programming, presentations, audio programming, and so forth. In the scenario 218 of FIG. 9, the main content stream 220 proceeds in time with content being distributed and played in an unaltered fashion. At transition point 222, supplemental content is available in one or more streams. Such supplemental content may be provided on the same device (e.g., a television) or a different device (e.g., a smartphone or a handheld device while the main constant stream is being played on a television). It may be noted that multiple, different devices may play back different supplemental content. Such different devices may be physically the same or different, and "differences" may comprise simply a different current user or audience, such that these devices may be provided with and output different content. The supplemental content is selected, if at all, based upon consideration of the factors discussed above, and typically based upon predictions of audience interest in the supplemental content. When provided, supplemental content may continue for a pre-determined time, and will typically end at a time 226. It may be noted that many such offerings may be considered and provided during a single main content stream. Moreover, supplemental content streams may be stacked so that more than one element of supplemental content may be provided at a time. Here again, such supplemental content streams may be provided with and play back different content.

In FIG. 10 alternative content streams are provided that may be spliced in or replace portions of the main content stream. In this scenario 228, the main content stream 220 proceeds to a transition point 222. Based upon a prediction of audience interest, then, one or more alternative content streams 230 may be provided. These will typically proceed for a selected amount of time based upon the particular alternative content stream and programming or the displayed playback stream may revert to the main content stream at a transition point 226. Here again, many such alternative content streams may be considered and provided in the content stream. As noted above, however, some or all of these may be offered or automatically programmed to replace sections of the main content stream, or only a portion of these may be provided if the audience interest prediction so indicates.

In FIG. 11, more complex scenarios may be envisaged as indicated by reference numeral 232. Here, a main content stream 220 proceeds to a transition point 234 at which time an alternative content stream 236 may be provided. As in previous cases, the transition time 234 may be essentially seamless and may be performed with little or no intervention or even knowledge by the audience. In this scenario, however, once the main content stream has branched to the alternative content stream 236, further branching may take place at subsequent times as indicated by transition times 238 and 242, with alternative content streams 240 and 244 being inserted to effectively replace some or all of the subsequent content stream then being provided. As also noted above, in all of these scenarios some audience participation may be called for, such as based upon recommendations made by the provider. Finally, various opt-outs may be offered or may be used as a default, with only certain of the alterations being made based upon whether opt-outs have been selected. Finally, it should be noted that all of the scenarios as summarized in FIGS. 9, 10 and 11 may be used in conjunction with a single main content stream. Other approaches to alteration of the content may also be contemplated.

Throughout the foregoing discussion, reference was made to alterations or modifications or adaptations of content. It should be borne in mind that many such alterations may be made, and once the technology is established, writers, producers, creative teams and the like may specifically formulate content with such adaptations in mind. By way of example only, adaptations may include simple text or graphical information, but may also consist of changes in the entire storyline, conclusion, and so forth. That is, based upon audience interest, one sector or a potential audience may not experience the same content as others. Even within the same venue, different audiences may experience content differently, such as adult audiences experiencing more adult appropriate content, with younger audiences experiencing different content. Other changes may include language alterations, music changes, deletion or inclusion of explicit material, censoring or replacement of sensitive material, and so forth.

It may also be noted that in certain use cases, the foregoing technologies may allow for altering "live" broadcasts that are altered, controlled, and/or directed to audiences by integrating and/or reference to data collected from an audience population (e.g., a multitude of homes). Current programming, for example, may collect information (e.g., votes) over a 24 hour period to provide programming changes, contest results, and so forth. The foregoing technologies may allow for very significant reduction in such delays (e.g., to on the order of seconds or minutes). Moreover, rich and meaningful feedback may be utilized (that is much more indicative of audience reaction than simple votes, texts messages, etc.), including multiple metrics extracted from each audience, based upon available information, as set forth above. Here again, audiences may opt in or out of such participation, but may find the experience much more interesting and enjoyable.

Moreover, in presently contemplated embodiments, some or all of the content replacement discussed above may be performed by handling the content as "objects" in an object-oriented programming environment. As will be appreciated by those skilled in the art, such objects will typically include features defined by the programming standard, such as methods and properties. Layering or replacement of content may be performed by instantiating such objects and executing them (either on the audience side, the provider side, or both). For example, if video, audio, data, and/or application objects are pre-defined, behavior and properties of the objects may be manipulated to provide the replacement and/or supplemental content discussed above. By way of example, for a television program such as a talent competition, a lower portion of a screen may be overlayed or replaced to provide audience feedback, information of interest, voting results, and so forth. For different types of devices (e.g., a television set, a smart phone, a hand-held playback device), then, the object may be defined to accommodate differences in the devices, such as, for example:

"if display TypeOf

TV: insertLayer (large lower third)

Tablet: insertLayer (medium lower third)

Smartphone: insertLayer (small lower third).

Additionally, it may be desirable to manipulate behavior of such objects as a layer or replacement portion of the display, such as by code defining "LowerThird.crawl=stop (or start)" to allow text or graphics to scroll across the screen. Details relating to the actual encoding of such functionality are well within the ambit of those skilled in the art.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A digital content delivery system comprising:
    an audience data collection system configured to collect audience activity data indicative of audience activity during playback of digital content;
    an audience environment collection system configured to collect audience environment data indicative of an audience environment at a time (t) of playback of the digital content, wherein the audience environment data comprises an environment vector (E(t)) indicating a set of two or more attributes of the audience environment at the time of playback;
    a background data storage system configured to store audience background data indicative of a characteristic of the audience;
    a processing system configured to determine a likely audience content interest based upon the audience activity data, the audience environment data, and the audience background data, wherein the likely audience content interest comprises one or more particular content alterations or supplements from a set of available content alterations or supplements that are predicted, prior to presenting the one or more particular content alterations or supplements, to enhance a viewing experience of the audience upon presentation, wherein the processing system determines the likely audience content interest by:
        generating correlation data sets by mapping the environment vector to a prediction vector, the prediction vector comprising two or more content attributes relevant for predicting content interest;
        calculating correlation coefficients for both a single attribute of the audience environment at the time of playback and multiple attributes of the audience environment at the time of playback, based upon the correlation data sets;
        identify strong correlations, zero correlations, or both that lead to a particular type of programming, based upon the correlation coefficients; and
        determine the likely audience content interest based upon the strong correlations, the zero correlations, or both; and
    a content adaptation system configured to alter or supplement a portion of digital content delivered to the audience, using the particular content alterations or supplements, based upon the determined likely audience content interest.

2. The system of claim 1, wherein the audience data collection system collects data indicative of audience selection of digital content for delivery to the audience.

3. The system of claim 1, wherein the audience data collection system collects data indicative of at least one of audience movement, audience identity, number of audience members, audience gaze, volume of auditory playback, and audience verbal activity during playback of the digital content.

4. The system of claim 1, wherein the audience environment collection system collects data indicative of at least one of lighting, temperature, and time of playback of the digital content.

5. The system of claim 1, wherein the background data comprises at least one of audience historical content selections, time of content playback, audience identity, audience location, audience demographics, and audience subscriptions.

6. The system of claim 1, wherein the processing system comprises a prediction engine configured to predict audience interest in at least one of a plurality of supplemental or alternative content streams.

7. The system of claim 1, wherein the system is configured to process the collected data and to alter the digital content during collection of the data.

8. The system of claim 1, wherein the system is configured to process the collected data and to alter the digital content during playback of the digital content to the audience.

9. The system of claim 1, wherein the system is configured to process the collected data and to alter the digital content in a time shifted manner adapted for a time when the audience experiences the digital content.

10. The system of claim 9, comprising a secondary audience data collection system configured to determine secondary audience data indicative of activity and/or environment of a secondary audience from a time earlier than the time when the audience experiences the digital content, and wherein the processing system is configured to determine the likely audience interest based in part on the secondary audience data.

11. The system of claim 1, wherein the digital content is altered at least partially prior to delivery to the audience.

12. The system of claim 1, wherein the digital content is altered at least partially by an audience playback system after delivery to the audience.

13. A digital content delivery method comprising:
accessing at least audience background data indicative of a characteristic of the audience;
determining an initial prediction of audience content interest based at least upon the background data, wherein the audience content interest comprises one or more particular content alterations or supplements from a set of available content alterations or supplements that are predicted, prior to presenting the one or more particular content alterations or supplements, to enhance a viewing experience of the audience upon presentation, wherein the initial prediction of audience content interest is determined by:
generating correlation data sets by mapping an environment vector to a prediction vector, the prediction vector comprising two or more content attributes relevant for predicting content interest;
calculating correlation coefficients for both a single attribute of an audience environment at a time of playback and multiple attributes of the audience environment at the time of playback, based upon the correlation data sets;
identify strong correlations, zero correlations, or both that lead to a particular type of programming, based upon the correlation coefficients; and
determine the likely audience content interest based upon the strong correlations, the zero correlations, or both;
monitoring audience activity data indicative of audience activity during the playback of digital content and audience environment data indicative of the audience environment during playback of the digital content;
adapting the prediction based at least upon the audience activity data, the audience environment data, and the audience background data; and
altering a portion of the digital content delivered to the audience based upon the adapted prediction.

14. The method of claim 13, comprising storing data indicative of the adapted prediction for use in predicting audience content interest at a later time.

15. The method of claim 13, wherein the audience activity data comprises data indicative of audience selection of digital content for delivery to the audience.

16. The method of claim 13, wherein the audience activity data comprises data indicative of at least one of audience movement, audience identity, number of audience members, audience gaze, volume of auditory playback, and audience verbal activity during playback of the digital content.

17. The method of claim 13, wherein the audience environment data comprises data indicative of at least one of lighting, temperature, and time of playback of the digital content.

18. The method of claim 13, wherein the audience background data comprises at least one of audience historical content selections, time of content playback, audience identity, audience location, audience demographics, and audience subscriptions.

19. The method of claim 13, the monitoring, predicting, and altering are performed in a time shifted manner adapted for a time when the audience experiences the digital content.

20. The method of claim 19, comprising referencing secondary audience data indicative of activity and/or environment of a secondary audience from a time earlier than the time when the audience experiences the digital content, and wherein the predicting and altering are performed based in part on the secondary audience data.

21. A digital content delivery method comprising:
accessing at least audience background data indicative of a characteristic of the audience, audience activity data indicative of audience activity during playback of digital content, and audience environment data indicative of an audience environment at a time (t) of playback of the digital content, wherein the audience environment data comprises an environment vector (E(t)) indicating a set of attributes of the audience environment at the time of playback;
predicting audience content interest based at least upon the background data, wherein the audience content interest comprises one or more particular content alterations or supplements from a set of available content alterations or supplements that are predicted, prior to presenting the one or more particular content alterations or supplements, to enhance a viewing experience of the audience upon presentation, wherein the audience content interest is predicted by:
generating correlation data sets by mapping the environment vector to a prediction vector, the prediction vector comprising two or more content attributes relevant for predicting content interest;
calculating correlation coefficients for both a single attribute of the audience environment at the time of playback and multiple attributes of the audience environment at the time of playback, based upon the correlation data sets;
identify strong correlations, zero correlations, or both that lead to a particular type of programming, based upon the correlation coefficients; and
determine the likely audience content interest based upon the strong correlations, the zero correlations, or both;
altering a portion of digital content delivered to the audience based upon the predicted particular audience content interest, using the one or more content alterations or supplements.

22. The method of claim 21, comprising adapting the prediction based at least upon the audience activity data, the audience environment data, and the audience background data.

23. The method of claim 21, wherein the method is performed during audience playback of the digital content.

24. The method of claim 21, wherein the accessing, predicting, and altering are performed in a time shifted manner adapted for a time when the audience experiences the digital content.

25. The method of claim 21, comprising referencing secondary audience data indicative of activity and/or environment of a secondary audience from a time earlier than the time when the audience experiences the digital content, and wherein the predicting and altering are performed based in part on the secondary audience data.

* * * * *